United States Patent Office 2,933,432
Patented Apr. 19, 1960

2,933,432

ANTI-SEBORRHEIC SUSPENSION OF TELLURIUM DIOXIDE

Aaron Lichtin, Philadelphia, Pa.

No Drawing. Application February 13, 1956
Serial No. 564,877

4 Claims. (Cl. 167—87)

This invention relates to formulations of therapeutically useful, stable compositions containing tellurium dioxide (water insoluble tellurium compounds) and methods of preparing the same.

When one inspects vertical column VI of the periodic table of the elements, the column beginning with the element oxygen, it will be observed that it consists of oxygen, sulfur, selenium and tellurium. These four elements are known to be related in their chemical properties. Within recent years it has been demonstrated that sulfur and selenium possess related therapeutic properties, namely, both are employed in the treatment of a skin condition, known as seborrheic dermatitis. While sulfur has been employed in the treatment of skin ailments since the dawn of history, the use of selenium in dermatology has not been investigated until comparatively recently. Based on the available therapeutic knowledge of these compounds, studies were made to determine whether and to what extent compounds of tellurium might also have similar therapeutic application.

These studies revealed that the water-soluble tellurium compounds, such as the tellurates and tellurites, are quite alkaline in reaction and that they tend to deteriorate in solution by the action of bacterial life and cause the solution thereof to take on a dark color. Because of this and the fact that they have been found to be quite poisonous even in small doses, such tellurium compounds are therapeutically objectionable.

Tellurium sulfide, which is a compound of tellurium and sulfur, is unstable in the presence of water, turning from a shade of brown to black.

Through my aforesaid studies, I have found that tellurium dioxide of appropriate physical and chemical quality has therapeutic value in the treatment of certain skin disorders, such as seborrheic dermatitis and dandruff. However, because tellurium dioxide is water-insoluble and difficult to wet, it cannot advantageously exercise its pharmacologic activity unless incorporated in a hydrophylic vehicle which will facilitate its intimate contact with the surface to which it is applied. Thus, it is among the principal objects of the present invention to effectively incorporate tellurium dioxide as the active constituent or principle in suspensions, shampoos, pastes, gels, ointments and the like for treating certain skin disorders, such as, seborrheic dermatitis and dandruff.

When ordinary commercially available dry powdered tellurium dioxide is incorporated in an aqueous medium, the resultant composition is not homogeneous and undergoes adverse chemical changes under ordinary conditions of storage which are evidenced by change in color and settling of the solids out of suspension. These physical and chemical changes are accompanied by a decrease in therapeutic value and usefulness of the composition in treating abnormal skin and scalp disorders.

It is accordingly a further object of this invention to provide a method for preparing a colloidal suspension of tellurium dioxide of such appropriate physical and chemical quality as to render it suitable for use as and incorporation in pharmacologic preparations effective for treating skin disorders.

It is another object of this invention to provide a method for stabilizing the tellurium dioxide in aqueous media so the tellurium dioxide present in the composition remains active for an indefinite period and does not result in any discoloration of the composition upon prolonged storage thereof.

It has been found that tellurium dioxide is exceptionally valuable as a treatment for scalp disorders, such as dandruff, and in accordance with my present invention, I provide and make available a composition containing tellurium dioxide which may be readily removed from the scalp after the treatment so that it does not cause irritation of the skin. In preparing such a composition or shampoo, I have found that it is desirable to employ a detergent as part of the formulation. The detergent not only serves the purpose of removing the tellurium dioxide from the scalp or skin following the treatment, but also effectively prevents any irritation which might be caused by prolonged contact of tellurium dioxide with the skin.

The word "detergent" as employed herein is intended to mean a cleansing agent which is capable of removing foreign particles, as well as having a cleansing function. There are available many different detergents which are classified into three major classes, namely, anionic, cationic and nonionic. Any of these classes of detergents may be employed to formulate the medicinal preparation, the principal desiderata being that the detergents should not only be efficient cleansing and sudsing agents, but should also be so compatible with the tellurium compound under the conditions of compounding employed in preparing the composition of the present invention that they do not in any way adversely affect the tellurium dioxide present in the composition, either chemically or physically. Another requirement for being compatible is that the detergents do not impair the stability of the composition. As the composition must be maintained on the acidic side, the detergents must also be compatible with this kind of an environment.

Representative of suitable anionic detergents are the alkyl-aryl sulfonate type, such as, decylbenzene sodium sulfonate, marketed by Monsanto under the trade name Santomerse D and a 27 percent solution of the sodium salt of alkyl-aryl polyether sulfonate, marketed by Rohm and Haas under the trade name Triton X–200; the sulfated alcohol type, such as, sodium lauryl sulfate marketed by Du Pont under the trade name Duponol C and sodium lauryl sulfoacetate marketed by National Aniline under the trade name Lathanol; and the sulfosuccinate type, such as, dihexyl sodium sulfosuccinate, marketed by American Cyanamid under the trade name Aerosol M.A.

A suitable cationic detergent is Hyamine 1622, marketed by Rohm and Haas, consisting of a crystalline form of diisobutyl phenoxy-ethoxyethyl dimethyl benzyl ammonium chloride, while representative of a satisfactory nonionic detergent is the Rohm and Haas product marketed under the trade name Triton X–100 consisting of an alkyl-aryl polyether alcohol.

With the exception of Aerosol M.A. and Hyamine 1622, the above mentioned detergents are all of the foaming type. While the foaming detergent is the more desirable to employ, an acceptable tellurium dioxide composition containing a nonfoaming detergent may be prepared in accordance with the present invention.

As has been indicated above, I have found that a satisfactory tellurium dioxide composition is obtained only through the use of refined tellurium dioxide as distinguished from that which is commercially available, such refined or pure tellurium dioxide being obtained, for example, in accordance with the following procedure (the quantities given being, of course, proportional).

First, an aqueous solution is obtained by dissolving 2.0 grams of potassium hydroxide in 5 cc. of distilled water, following which commercially available tellurium dioxide in dry powdered state in the amount of 2.5 grams is added to and completely dissolved in the solution to form a solution of potassium tellurite as the reaction product. This reaction product is thereupon filtered to obtain a clear solution of potassium tellurite to which is added about 40 cc. of distilled water, following which there is also added slowly and with constant stirring from 1.5 to 1.8 grams of sulfuric acid, the amount of the acid so added being such as to obtain a suspension of tellurium dioxide having a pH of from 5.0 to 6.0. Additional water is added, if necessary, to obtain a final suspension volume of 50 cc.

There is thus obtained as the final preparation a suspension containing 5 percent (w./v.) of tellurium dioxide of suitable quality for pharmacological use. By adding additional distilled water to the tellurium dioxide suspension prepared as above described, the percentage of tellurium dioxide in suspension may be reduced, e.g., to 2.5 percent (w./v.) by adding enough water to make up a final volume of 100 cc. of the suspension.

In lieu of sulfuric acid, various other water soluble inorganic and organic acids, such as, hydrochloric, lactic, citric, tartaric and succinic acids, may be employed to obtain the desirably stabilized tellurium dioxide. The acid added to the potassium tellurite solution should be of sufficient amount to obtain a pH of from 5.0 to 6.0, inasmuch as the stability of the final preparation depends to large extent upon its pH. While the pH should be on the acid side, it need not be highly acidic. A pH on the alkaline side must in any event be avoided in order not to adversely affect the tellurium dioxide present in the preparation and the stability of the colloidal suspension thereof.

When it is desired to prepare a detergent suspension of tellurium dioxide, substantially the same procedure is followed as above described, excepting that instead of adding distilled water to the suspension of tellurium dioxide there is added an aqueous solution of the desired detergent prepared in accordance with the following formulae:

Example I

Santomerse D (decylbenzene sodium sulfonate), 15 gm.
Distilled water, q.s. to make 100 cc.

Example II

Duponol C (sodium lauryl sulfate), 15 gm.
Distilled water, q.s. to make 100 cc.

Example III

Lathanol (sodium lauryl sulfacetate), 15 gm.
Distilled water, q.s. to make 100 cc.

Example IV

Aerosol M.A. (dihexyl sodium sulfosuccinate), 15 gm.
Distilled water, q.s. to make 100 cc.

Example V

Hyamine 1622 (crystalline diisobutylphenoxy-ethoxyethyl dimethyl benzyl ammonium chloride), 10 gm.
Distilled water, q.s. to make 100 cc.

Example VI

Triton X–100 (alkyl-aryl polyether alcohol), 15 gm.
Distilled water, q.s. to make 100 cc.

Example VII

Triton X–200 (27 percent solution of sodium salt of alkyl-aryl polyether sulfonate), 100 cc.

Example VIII

Lathanol, 2.5 gm.
Triton X–200, q.s. to make 100 cc.

Example IX

Duponol, 2.5 gm.
Triton X–200, q.s. to make 100 cc.

Thus, for preparing an effective shampoo containing 2.5 percent (w./v.) of tellurium dioxide colloidally suspended in an aqueous detergent solution such as that of Example I, 2.0 grams of potassium hydroxide is initially dissolved in 5 cc. of distilled water and to this solution is added 2.5 grams of tellurium dioxide to form potassium tellurite. Upon filtering the latter to obtain a clear solution thereof, there is added to the solution about 85 cc. of the Santomerse D solution prepared as per the formula of Example I. Then the desired acid, as, for example, any of those previously mentioned, is added in the amount necessary (from 1.5 to 1.8 cc.) to obtain a colloidal suspension of tellurium dioxide having an adjusted pH of from 5 to 6. To this colloidal suspension is then added an additional amount of the Santomerse D solution to provide a final suspension volume of 100 cc.

The same procedure is followed for use of each of the detergent solutions prepared pursuant to the formulae of Examples II to IX.

For preparing a cream containing 2.5 percent of tellurium dioxide by weight, there is prepared a suitable cream base of any desired formula, as, for example, the following:

Spermaceti _____ gm__ 18
Stearyl alcohol _____ gm__ 12
Cetyl alcohol _____ gm__ 9
Propylene glycol _____ cc__ 12
    Approximate total weight, gm _____ 50

Upon adding to and thoroughly mixing into this cream base 50 cc. of the colloidal suspension containing 5 percent (w./v.) of tellurium dioxide prepared as hereinbefore described, there is obtained an effective cream containing 2.5 percent of colloidal tellurium dioxide by weight.

Similarly, an effective paste containing 2.5 percent of colloidal tellurium dioxide by weight may be obtained by admixing the 50 cc. colloidal suspension containing 5 percent (w./v.) of tellurium dioxide prepared as hereinbefore described with a paste base prepared, for example, pursuant to the following formula:

Gm.
Wool fat _____ 10
Cholesterol _____ 3
Petrolatum (white) _____ 37
    Total weight _____ 50

I have found that preparations containing 2.5 percent colloidal tellurium dioxide are most effective and safe for use in treatment of various skin disorders, including particularly seborrheic dermatitis and dandruff, not only in the form of shampoos but also pastes and creams. Laboratory tests have shown such preparations to be nontoxic and as not inducing the formation of oiliness in the scalp. The shampoo preparations containing tellurium dioxide as prepared in accordance with the present invention are readily removed from the hair by simple rinsing with warm water and do not have any tendency to stain the hair. Moreover, the preparations, in shampoo, paste and cream form, are all entirely free of offensive odors.

Whereas in the foregoing description and examples, the percentage of tellurium dioxide is given as 2.5 percent w./v. or by weight, it will be understood that this is a preferred percentage for optimum effectiveness. The percentage, however, may vary within limits, as from 2.3 to 2.7 percent, without materially affecting the therapeutic value of the preparation,

What is claimed as new and useful is:

1. A shampoo composition for the treatment of seborrheic dermatitis, dandruff and other seborrheic eruptions comprising a stabilized colloidal suspension having 2.3–2.7 percent (w./v.) of tellurium dioxide and having an adjusted pH of 5.0 to 6.0, said suspension having incorporated therein a detergent selected from the group consisting of the anionic, cationic and nonionic classes thereof.

2. A shampoo composition as defined in claim 1 wherein said detergent consists of an alkyl-aryl sulfonate.

3. A shampoo composition as defined in claim 1 wherein said detergent consists of a sulfated alcohol.

4. A shampoo composition as defined in claim 1 wherein said detergent consists of a sulfosuccinate.

References Cited in the file of this patent

UNITED STATES PATENTS

| | | |
|---|---|---|
| 2,118,566 | Miles | May 24, 1938 |
| 2,648,638 | Richter | Aug. 11, 1953 |
| 2,694,669 | Baldwin et al. | Nov. 16, 1954 |

OTHER REFERENCES

Modern Drugs, May 1955, p. 208.

Mellor: Mod. Inorganic Chem., Longman's, Green and Co., N.Y., 1939, pp. 765–7.

Sexton: Chem. Constitution and Biol. Activity, London, 1949, p. 257.

Mellor: Comprehensive Treatise on Inorganic and Theoretical Chem., vol. 11, Longman's, Green and Co., N.Y., 1931, p. 83.

Mead et al.: Am. J. Physiology, vol. 3, 1900, pp. 20–21.

Gooch et al.: Outlines of Inorganic Chem., The MacMillan Co., N.Y., 1905, pp. 282–4.

Munn et al.: Jour. of Bacteriology, vol. 10, 1925, pp. 79–86, esp. at p. 82.

Gross: Delaware State Med. Jour., vol. 27, January 1955, pp. 15–20.